US008615875B2

(12) United States Patent
Alquier et al.

(10) Patent No.: US 8,615,875 B2
(45) Date of Patent: Dec. 31, 2013

(54) METHOD OF MANUFACTURING A BLADING COMPONENT

(75) Inventors: Damien Alquier, Paris (FR); Sebastien Digard Brou De Cuissart, Paris (FR)

(73) Assignee: Snecma, Paris (FR)

( * ) Notice: Subject to any disclaimer, the term of this patent is extended or adjusted under 35 U.S.C. 154(b) by 313 days.

(21) Appl. No.: 13/002,992

(22) PCT Filed: Jul. 16, 2009

(86) PCT No.: PCT/FR2009/051415
§ 371 (c)(1),
(2), (4) Date: Jan. 7, 2011

(87) PCT Pub. No.: WO2010/007322
PCT Pub. Date: Jan. 21, 2010

(65) Prior Publication Data
US 2011/0113627 A1 May 19, 2011

(30) Foreign Application Priority Data
Jul. 16, 2008 (FR) ..................................... 08 54845

(51) Int. Cl.
*B21D 53/78* (2006.01)
*B21K 3/04* (2006.01)
*B23P 15/00* (2006.01)

(52) U.S. Cl.
USPC ..................... 29/889.721; 29/889.7; 164/369; 374/144; 374/179

(58) Field of Classification Search
USPC ............ 29/889.1, 889.721; 164/45, 516, 369; 374/144, 179; 415/223, 234
See application file for complete search history.

(56) References Cited

U.S. PATENT DOCUMENTS

| | | | | |
|---|---|---|---|---|
| 3,653,976 | A * | 4/1972 | Miller et al. | 136/231 |
| 4,244,222 | A * | 1/1981 | Hoyer et al. | 374/138 |
| 5,106,203 | A * | 4/1992 | Napoli et al. | 374/144 |
| 6,478,539 | B1 * | 11/2002 | Trutschel | 415/223 |
| 6,602,047 | B1 * | 8/2003 | Barreto et al. | 415/1 |
| 6,832,889 | B1 * | 12/2004 | Lee et al. | 415/115 |

(Continued)

FOREIGN PATENT DOCUMENTS

DE 10 2005 01346 8/2006

OTHER PUBLICATIONS

International Search Report issued Jan. 21, 2010 in PCT/FR09/051415 filed Jul. 16, 2009.

(Continued)

*Primary Examiner* — Alexander P Taousakis
*Assistant Examiner* — Lee Holly
(74) *Attorney, Agent, or Firm* — Oblon, Spivak, McClelland, Maier & Neustadt, L.L.P.

(57) ABSTRACT

A method of manufacturing a metal blading sector for low-pressure guide vanes of a turbomachine of which at least one blade includes an internal cavity configured to accept or communicate with a gas detection probe and at least one hole formed in the wall constituting a passage for gas from a low-pressure zone of the turbomachine toward the cavity and the probe through the fitting, into a casting mold, of a core corresponding to the cavity and the casting of a molten metal in the cavity of the casting mold. The core includes, for each hole for communication with the cavity, a protrusion penetrating the internal surface of the mold and constituting the only element holding the core in position in the casting mold.

6 Claims, 2 Drawing Sheets

(56) References Cited

U.S. PATENT DOCUMENTS

| | | | | |
|---|---|---|---|---|
| 7,172,012 | B1 * | 2/2007 | Memmen | 164/45 |
| 2007/0048140 | A1 * | 3/2007 | Farr et al. | 416/193 A |
| 2008/0044282 | A1 * | 2/2008 | Pietraszkiewicz et al. | 416/90 R |
| 2008/0110024 | A1 * | 5/2008 | Reilly et al. | 29/897.2 |
| 2008/0135718 | A1 * | 6/2008 | Lee et al. | 249/62 |
| 2008/0145234 | A1 * | 6/2008 | Lee et al. | 416/96 R |

OTHER PUBLICATIONS

U.S. Appl. No. 13/913,759, filed Jun. 10, 2013, Digard Brou De Cuissart, et al.

* cited by examiner 2a 2b 4a 4b

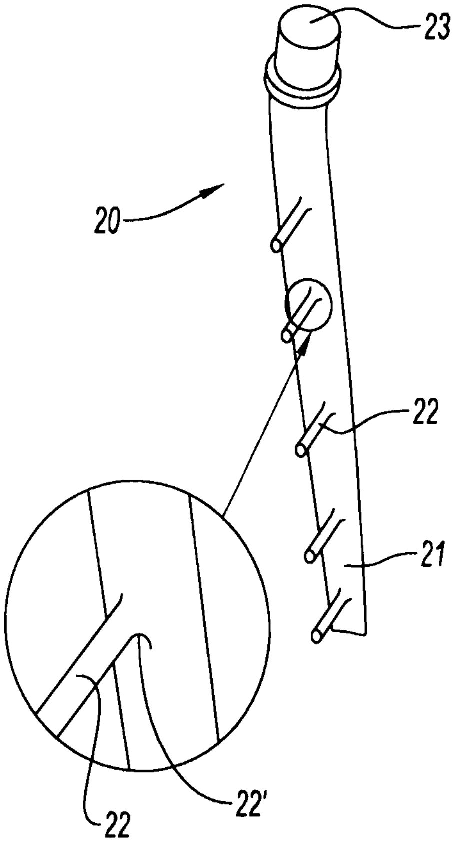
Fig. 5
Fig. 6
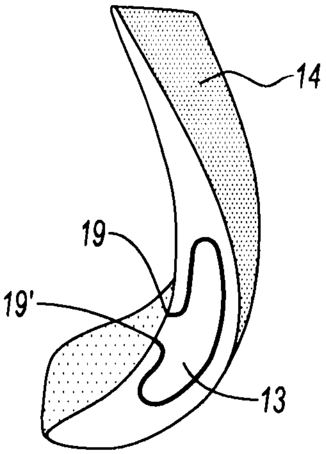
Fig. 7

METHOD OF MANUFACTURING A BLADING COMPONENT

BACKGROUND OF THE INVENTION

1. Field of the Invention

The present invention relates to the manufacture of metal turbomachine blading, more particularly of components having internal cavities and holes or orifices allowing these cavities to communicate with the outside of the blading.

2. Description of the Related Art

Such blading is generally manufactured by casting individual blading components each constituting a blading sector, using a lost wax casting technique that is well known per se. This technique goes through a stage of producing a model in wax or some other equivalent material which comprises an internal component that forms a casting core and features the cavities of the blading. In order to form the model, use is made of an injection mold for the wax in which the core is placed and into which the wax is injected. The wax model is then dipped several times into casting slip consisting of a suspension of ceramic particles in order to produce a shell mold. The wax is eliminated and the shell mold is baked. The blading is obtained by casting molten metal which then occupies the voids between the interior wall of the shell mold and the core.

In a turbomachine low-pressure guide vanes stage, some of the blades or vanes have an internal cavity and a series of holes causing this cavity to communicate with the outside of the blade. This cavity and this series of holes allow temperature detection probes, known as EGT (exhaust gas temperature) probes, to be fitted. By way of example, for low-pressure guide vanes of a turbomachine of the type found in the prior art, comprising 18 blading segments or sectors, one blade in each sector comprising 8 blades is provided with an internal cavity and with a series of holes.

The temperature probes in this particular region of the turbomachine are used to monitor correct operation and engine wear.

Using the current technique, the cavity in this blading that is to accept a temperature probe is produced by fitting cores equipped with upper and lower tenons which, when the metal is cast, form orifices in the exterior platform and in the interior platform of the component; the orifice in the exterior platform is intended to accept or be in communication with the temperature probe, while the orifice in the interior platform serves only to hold the core in place while the metal is being cast and therefore requires the fitting of a blanking plate, which is brazed on during the finishing operations on the blading sector.

The holes providing communication between the cavity of the airfoil of the blade that accepts the probe and the outside of the blading are produced by drilling/machining (notably by spark erosion or electrical discharge machining (EDM)) after the component has been cast.

This approach therefore entails an additional operation which, furthermore, generates a scorched region around the hole where the mechanical properties are inadequate.

BRIEF SUMMARY OF THE INVENTION

It is an objective of the present invention to provide a method for manufacturing metal blading components that avoids these disadvantages.

To this end, the invention proposes a method of manufacturing a metal blading sector for the low-pressure guide vanes of a turbomachine of which at least one blade comprises an internal cavity intended to accept or communicate with a gas detection probe and at least one hole formed in the wall constituting a passage for gas from the low-pressure zone of the turbomachine toward said cavity and the probe through the fitting, into a casting mold, of a core corresponding to said cavity and the casting of a molten metal in the cavity of said casting mold. This method is characterized in that said core comprises, for each hole for communication with said cavity, a protrusion penetrating the internal surface of the mold and constituting the only element holding the core in position in the casting mold.

According to the invention this detection probe preferably constitutes a temperature detection probe, more specifically a temperature detection probe of the EGT probe type.

According to another preferred aspect of the invention, the method is more particularly carried out using a lost wax casting technique, by producing a shell mold in which the core is fitted, the shell mold constituting the casting mold.

According to yet another preferred feature of the invention, the base of the protrusions of the casting mold is “radiused” or rounded, producing a fillet at the base of the casting hole, thus making it possible to avoid the formation of cracks or other micro-fissures that cannot be detected during manufacturing process controls, at the time of casting.

According to yet another preferred aspect of the invention, the casting core comprises several protrusions (for example between 3 and 8 protrusions, preferably 5) which constitute the only elements holding the core in position in the casting mold, whereas an orifice intended for introducing a probe into the cavity in at least one blade of the blading component is obtained by drilling said component in the prolongation of the cavity.

In this way, a blading component is obtained that has a blade with a cavity and several holes (for example between 3 and 8 holes, preferably 5).

According to a particularly advantageous embodiment of this last preferred aspect of the invention, it is possible to produce just one model of blading components/blading sectors for the entire guide vane assembly, whereas only those blading sectors that are intended to accept a probe are pierced in the prolongation of the cavity. That makes it possible to realize significant savings from the production process and stock control standpoints.

The novel method according to the invention has the following advantages over the method of the prior art:

- savings resulting from the elimination of the operation of piercing the (five) holes in the blading with internal cavity using electrical discharge machining and savings resulting from the elimination of scrap associated with this tricky operation;
- elimination of the operation of brazing a blanking plate over the lower exit hole of the core in the present-day process.

BRIEF DESCRIPTION OF THE SEVERAL VIEWS OF THE DRAWINGS

Further details and features of the invention will become apparent from reading the description of two embodiments of blading sectors for turbomachine low-pressure guide vane assemblies, which have been given by way of nonlimiting examples, with reference to the accompanying drawings in which:

FIG. 5 depicts a casting core according to the invention;

FIG. 6 shows an enlargement of the radiused base of one of the protrusions of the core according to FIG. 5; and FIG. 7 depicts a cross section through a blade or airfoil with cavity and hole, according to the invention, showing the radiused shape of the hole.

DETAILED DESCRIPTION OF THE INVENTION

Figure 1:
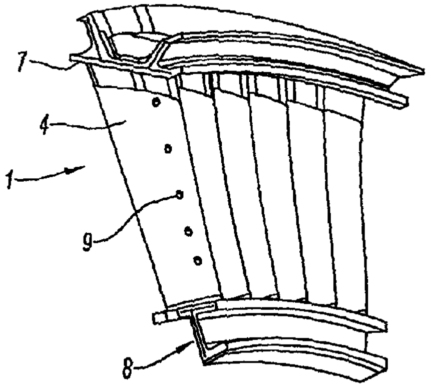
FIG. 1 depicts a typical blading sector for a turbomachine low-pressure guide vane assembly.

The figures illustrate the manufacture of a blading sector 1 for a turbomachine low-pressure guide vane assembly as depicted in FIG. 1. The sector 1 is made up of blades 4, of which there are six in FIG. 1, arranged radially between an inner platform 8 and a radially outer platform 7. The two platforms delimit the gas duct in which the airfoils of the blades guide the gaseous flow. Once assembled, the sectors form a ring of guide vanes. The sector depicted is a sector from the low-pressure stages of the turbomachine. The airfoils are solid with the exception, here, of one airfoil the function of which is to allow gas to be bled off so that the gas temperature can be measured. This is a measurement known as EGT. The airfoil of the first blade in this sector is pierced with orifices (9) placing the gas duct in communication with its internal cavity.

Figure 2:
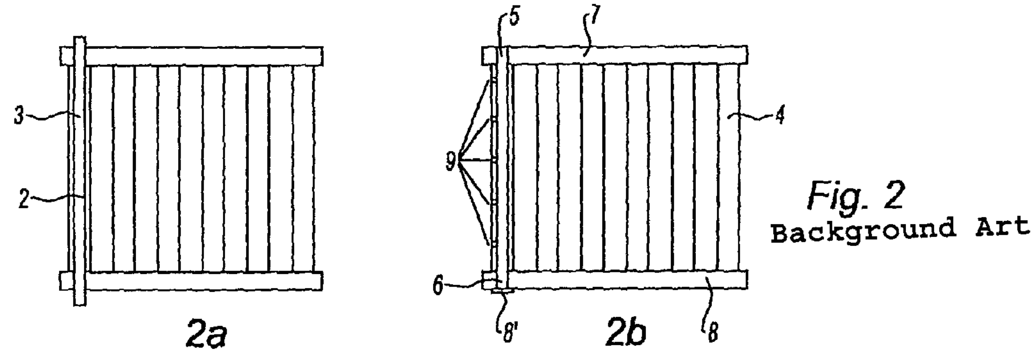
Fig. 2 Background Art
FIGS. 2*a* and 2*b* schematically depict two stages in the manufacture of a blading sector using the present-day technique.

As illustrated in FIG. 2*a* which schematically depicts a model for casting a blading sector, the model of one of the airfoils is provided with a core 2. The casting core 2, using present-day technology (generally made of ceramic), forms the cavity 3 in the model of the airfoil 4 of the blading sector 1. Following casting as depicted by FIG. 2*b*, two orifices 5 and 6 are obtained in the upper 7 and lower 8 platforms respectively of the blading sector 1, whereas the holes 9 in the wall of the blade that allow the cavity 3 to communicate with the outside of the blade 4, measuring approximately 2.2 mm, have to be pierced after the metal has been cast, using EDM (electrical discharge machining).

The upper orifice 5 allows the fitting of an EGT probe that measures temperature for the cockpit alarm, whereas the lower orifice 6 has to be resealed by brazing a plate 8' over it.

Figure 3:
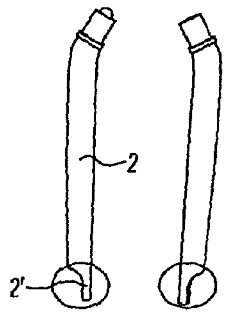
Fig. 3 Background Art
FIG. 3 depicts a casting core as used at the present time before the invention.

The core 2 according to the present-day technique requires, on account of its length, a lower exit to hold it in the shell mold. This has, as disadvantages, the fact that the orifice 6 thus generated has to be replugged and that the core 2 comprises a delicate protrusion 2', depicted in FIG. 3, because of the lack of space available for the core exit in the region of the inner platform 8.

It is an object of the invention therefore to limit the breakage of cores at the protrusions, to cease having to replug the orifice 6 and to eliminate the operation of piercing the holes 9 after the component has been cast.

Figure 4:
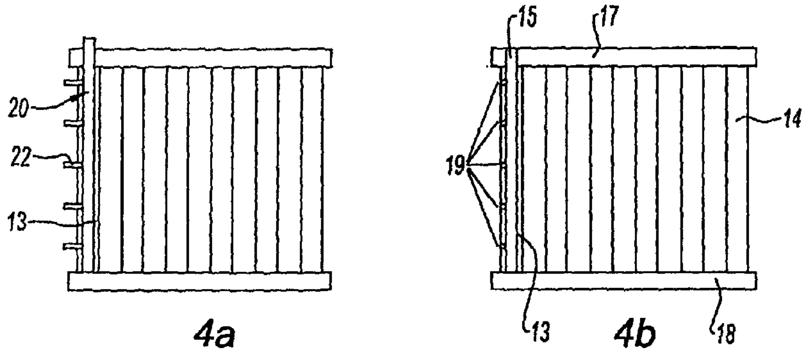
FIGS. 4*a* and 4*b* schematically depict the manufacture of a blading sector according to the invention.

As FIGS. 4*a* and 4*b* illustrate, in the method according to the invention, use is made of the holes that are to be formed in the wall of the airfoil for holding a core 20 in position, via protrusions 22 on the ceramic core 20. The core 20 according to the invention is depicted in FIG. 5. It comprises a tubular part 21 the shape of which corresponds to that of the cavity to be obtained in the airfoil. A tenon 23 forms the opening in the upper platform. Distributed along this tubular part 21 are rod-like protrusions 22 extending at right angles to the axis of the core. These protrusions have a cross section that corresponds to that of the orifices that are to be formed in the wall of the airfoil. They are equal in number to the number of orifices to be created. FIG. 4*a* shows the layout of the core in the casting model. The core 20 is held in position by the protrusions 22 that pass through the wall of the model. FIG. 4*b* shows a diagram of a sector obtained after casting. The blades 14 are arranged between the platforms, namely the inner platform 18 and the outer platform 17. A blade has a longitudinal cavity 13 pierced with orifices 19 placing the gas duct in communication with the cavity 13. The cavity 13 does not have any opening in the inner platform 18.

The holes 19 that cause the cavity 13 to communicate with the outside of the blade 4—known as the EGT (Exhaust Gas Temperature) holes—are therefore obtained by casting.

This then eliminates the delicate part of the core formed by the protrusion emerging in the region of the lower platform, and at the same time eliminates the need for the orifice thus generated to be replugged and avoids the operation of piercing the EGT holes using electrical discharge machining. The appearance of heat-affected zones (scorched zones) around the holes and that may lead to impaired mechanical behavior are avoided. In addition, the presence of holes along the airfoil makes it possible for the core to be eliminated more simply, by chemical attack, from the metal component in the absence of an exit in the region of the lower platform.

The invention therefore involves using a core 20 which is shorter than the core 2 of the prior art and comprises protrusions or "spikes" 22 by means of which it is held in position. These are, for example, made of ceramic, but the spikes could also be formed of quartz tubes incorporated into the core when it is injection molded.

As illustrated more particularly by FIG. 6 which is an enlargement of the core of FIG. 5, the base 22' of the protrusions 22 of the core 20 is radiused or rounded giving it what is known as a "fillet".

The shape of the holes 19 thus obtained by casting metal in the mold has a corresponding fillet/rounded portion 19', as illustrated in FIG. 7. This radiused shape 19' of the hole 19 makes it possible to avoid the formation of internal cracks, these being a type of defect that is practically undetectable by manufacturing process control methods.

According to an alternative form of the invention (which has not been depicted in the figures), the core 20 may also be produced without an exit in the upper platform 17; in such an instance, the core is held in position in the mold only by the protrusions 22 and no upper orifice 15 is formed.

This alternative form means that a single model of guide vane blading sectors can be manufactured; thus, only those items of this single sector that are intended to accept a probe are modified, by piercing an orifice 5' in the upper platform 17, to communicate with the cavity 13.

This then realizes additional savings from the production process and stock control standpoints.

The invention claimed is:

1. A method of manufacturing a metal blading sector for low-pressure guide vanes of a turbomachine of which at least one blade comprises an internal cavity configured to accept or communicate with a gas detection probe and at least one hole formed in the wall constituting a passage for gas from a low-pressure zone of the turbomachine toward the cavity and the probe through a fitting, the method comprising:

providing a casting mold of the sector, the casting mold including a first portion corresponding to a radially outer platform of the sector, a second portion corresponding to a radially inner platform of the sector, and at least one third portion extending between the first and second portions and corresponding to the at least one blade;

fitting a core corresponding to the cavity into the casting mold; and casting a molten metal in between an interior wall of the casting mold and the core to form the sector, wherein the core comprises, for each hole for communication with the cavity, a protrusion penetrating an internal surface of the mold and holding the core in position in the casting mold, and wherein a first end of the core extends through the first portion of the casting mold, and a second end of the core extends to an inner surface of the second portion of the casting mold such that the cavity does not have any opening in the inner platform of the sector.

2. The method as claimed in claim 1, wherein the detection probe constitutes a temperature detection probe.

3. The method as claimed in claim 2, wherein the detection probe constitutes a temperature detection probe of EGT probe type.

4. The method as claimed in claim 2, wherein the method is carried out using a lost wax casting technique, by producing a shell mold in which the core is fitted, the shell mold constituting the casting mold.

5. The method as claimed in claim 2, wherein a base of the protrusions of the casting mold is radiused or rounded, producing a fillet at the base of the casting hole.

6. The method as claimed in claim 2, wherein the core comprises plural protrusions.

* * * * *